(12) United States Patent
Jeong et al.

(10) Patent No.: US 11,372,378 B2
(45) Date of Patent: Jun. 28, 2022

(54) APPARATUS AND METHOD FOR AUTOMATICALLY TUNING FLUID TEMPERATURE PID CONTROLLER HAVING PHYSICAL PROPERTY OF PROCESS AS CONSTRAINT CONDITION

(71) Applicant: DOOSAN HEAVY INDUSTRIES & CONSTRUCTION CO., LTD., Changwon-si (KR)

(72) Inventors: Kwang Hun Jeong, Changwon (KR); Hyo Jun Kim, Suwon (KR); Hyung Keun Chi, Yongin (KR)

(*) Notice: Subject to any disclaimer, the term of this patent is extended or adjusted under 35 U.S.C. 154(b) by 0 days.

(21) Appl. No.: 17/133,176

(22) Filed: Dec. 23, 2020

(65) Prior Publication Data
US 2021/0223746 A1    Jul. 22, 2021

(30) Foreign Application Priority Data
Jan. 20, 2020    (KR) .................. 10-2020-0007354

(51) Int. Cl.
*G05B 13/02* (2006.01)
*G06N 3/063* (2006.01)
*G05B 11/42* (2006.01)

(52) U.S. Cl.
CPC .......... *G05B 13/0205* (2013.01); *G05B 11/42* (2013.01); *G05B 13/027* (2013.01); *G06N 3/063* (2013.01)

(58) Field of Classification Search
CPC .. G05B 13/0205; G05B 11/42; G05B 13/027; G05B 13/048; G06N 3/063; G06N 3/02; G05D 23/19

USPC .......................................... 700/37
See application file for complete search history.

(56) References Cited

U.S. PATENT DOCUMENTS

| | | | | |
|---|---|---|---|---|
| 5,268,835 | A | * | 12/1993 | Miyagaki ........... G05B 13/0285 700/31 |
| 5,847,952 | A | | 12/1998 | Samad |
| 9,500,361 | B2 | * | 11/2016 | Meerbeck ............... F01K 21/00 |
| 2019/0187631 | A1 | | 6/2019 | Badgwell et al. |

FOREIGN PATENT DOCUMENTS

| | | | |
|---|---|---|---|
| JP | 2015-84155 | * | 4/2015 |
| KR | 2004-0024854 | * | 3/2004 |
| KR | 1020010041714 | | 4/2004 |

(Continued)

OTHER PUBLICATIONS

Yamamoto et al., "A Self-Tuning PID Controller and its Application for an Ethylene Cracking Furnace", 1996, IEEE, p. 275-281. (Year: 1996).*

(Continued)

*Primary Examiner* — Hien D Khuu
(74) *Attorney, Agent, or Firm* — Harvest IP Law, LLP

(57) ABSTRACT

An apparatus for automatically tuning a fluid temperature PID (proportional-integral-differential) controller is provided. The apparatus for automatically tuning a fluid temperature PID controller includes: a setter configured to calculate an initial value of a gain of a controller configured to control a fluid temperature by deriving a physical property of the fluid temperature, and a tuner configured to tune the initial value of the gain of the controller using an artificial intelligence neural network algorithm according to a control target.

18 Claims, 6 Drawing Sheets

(56) References Cited

FOREIGN PATENT DOCUMENTS

| KR | 100919572 | | 3/2009 |
| KR | 2017-0003254 | * | 1/2017 |
| KR | 1020180032453 | | 3/2018 |

OTHER PUBLICATIONS

George et al. "Tuning Performance of PID Controller with Advanced Hybrid Technology", 2017, IEEE, p. 1698-1708 (Year: 2017).*

* cited by examiner

APPARATUS AND METHOD FOR AUTOMATICALLY TUNING FLUID TEMPERATURE PID CONTROLLER HAVING PHYSICAL PROPERTY OF PROCESS AS CONSTRAINT CONDITION

CROSS-REFERENCE TO RELATED APPLICATION

This application claims priority to Korean Patent Application No. 10-2020-0007354, filed on Jan. 20, 2020, the disclosure of which is incorporated by reference herein in its entirety.

BACKGROUND

Field

Apparatuses and methods consistent with exemplary embodiments relate to a technology of tuning a proportional-integral-differential (PID) controller, and more particularly, to an apparatus and a method for automatically tuning a fluid temperature PID controller having a physical property of a process as a constraint condition.

Description of the Related Art

A proportional-integral-differential (PID) controller is a representative controller most used in the industry. The controller has a structure of a feedback controller and has a scheme of calculating an error by comparing an output value of the object to be controlled with a target value and utilizing the error in calculating a control value. A standard form includes all proportional-integral-differential terms, but in some cases, a controller consists only of proportional terms, proportional-integral terms, or proportional-differential terms.

Setting a control parameter of the proportional, integral, and differential terms, that is, a gain, is called tuning, and commonly known tuning methods include a Zigler-Nichols method, a Cohen-Coon method, and a Dahlin method.

Because different controller manufacturers have different algorithms for calculating control value, there is a limit to tuning the PID controller with the aforementioned tuning method in the real site, and in most cases, tuning of the PID controller depends on experience.

Various automatic tuning methods have been developed to overcome the limitation that tuning of PID controller depends on experience, but there are various constraints on application to industrial site due to complex or increased computational volume due to the use of higher functions in the tuning stage.

SUMMARY

Aspects of one or more exemplary embodiments provide an apparatus and a method for automatically tuning a fluid temperature PID controller having a physical property of a process as a constraint condition.

Additional aspects will be set forth in part in the description which follows and, in part, will become apparent from the description, or may be learned by practice of the exemplary embodiments.

According to an aspect of an exemplary embodiment, there is provided an apparatus for automatically tuning a fluid temperature PID (proportional-integral-differential) controller including: a setter configured to calculate an initial value of a gain of a controller configured to control a fluid temperature by deriving a physical property of the fluid temperature, and a tuner configured to tune the initial value of the gain of the controller using an artificial intelligence neural network algorithm according to a control target.

The tuner may include a primary tuner configured to derive a primary gain through the artificial intelligence neural network algorithm based on a forecast model, and to tune the gain of the controller to the primary gain derived from the initial value.

The forecast model may be a fluid temperature forecast model expressed by a tertiary time delay function.

The primary gain may have a first limit range based on the initial value.

The tuner may further include a secondary tuner configured to derive a secondary gain through the artificial intelligence neural network algorithm based on a real system, and to tune the gain of the controller to a secondary gain derived from the primary gain.

The secondary gain may have a second limit range based on the primary gain, the second limit range being a range smaller than the first limit range.

The setter may include a property deriver configured to calculate the physical property of the fluid temperature through an energy conservation equation.

The physical property of the fluid temperature may include at least one of a fluid temperature change width, a property time, and a non-reaction time.

The setter may further include an initial setter configured to derive the initial value of the gain of the controller from the physical property of the fluid temperature.

The control target may include at least one of stabilization time minimization, overshoot minimization, and transient response deviation minimization.

According to an aspect of another exemplary embodiment, there is provided an apparatus for automatically tuning a fluid temperature PID controller including: a setter configured to calculate a physical property of a fluid temperature through an energy conservation equation, and to derive an initial value of a gain of the controller configured to control the fluid temperature from the calculated physical property of the fluid temperature, and a tuner configured to tune the initial value of the gain of the controller using an artificial intelligence neural network algorithm according to a control target.

The tuner may include a primary tuner configured to derive a primary gain by tuning the initial value of the gain of the controller based on a forecast model, and a secondary tuner configured to derive a secondary gain by tuning the derived primary gain based on a real system.

The forecast model may be a fluid temperature forecast model expressed by a tertiary time delay function.

The primary gain may have a first limit range based on the initial value, the secondary gain has a second limit range based on the primary gain, the second limit range being a range smaller than the first limit range.

The physical property of the fluid temperature may include at least one of a fluid temperature change width, a property time, and a non-reaction time.

According to an aspect of another exemplary embodiment, there is provided a method for automatically tuning a fluid temperature PID controller including: calculating, by a setter, an initial value of a gain of a controller configured to control a fluid temperature by deriving a physical property of the fluid temperature, and tuning, by a tuner, the initial value of the gain of the controller using an artificial intelligence neural network algorithm according to a control target.

The tuning of the initial value of the gain of the controller may include deriving, by a primary tuner of the tuner, a primary gain by tuning the initial value of the gain of the controller based on a forecast model, and deriving, by a secondary tuner of the tuner, a secondary gain by tuning the derived primary gain based on a real system.

The forecast model may be a fluid temperature forecast model expressed by a tertiary time delay function.

The primary gain may have a first limit range based on the initial value, and the secondary gain has a second limit range based on the primary gain, the second limit range being a range smaller than the first limit range.

The calculating of the initial value of the gain of the controller may include calculating, by a property deriver of the setter, the physical property of the fluid temperature through an energy conservation equation, and deriving, by an initial setter of the setter, the initial value of the gain of the controller from the physical property of the fluid temperature.

The physical property of the fluid temperature may include at least one of a fluid temperature change width, a property time, and a non-reaction time.

The control target may include at least one of stabilization time minimization, overshoot minimization, and transient response deviation minimization.

According to one or more exemplary embodiments, it is possible to automatically tune the PID controller for a fluid temperature control, thereby reducing a human working time required for tuning the controller. Considering the physical property and using the artificial intelligence algorithm, it is possible to set the initial gain and perform the specific tuning, thereby improving the fluid temperature control performance. Further, the concept proposed by the exemplary embodiments may be applied as it is when only the property of the process is understood if the property of the process is different, thereby being utilized in various fields other than the fluid temperature control.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
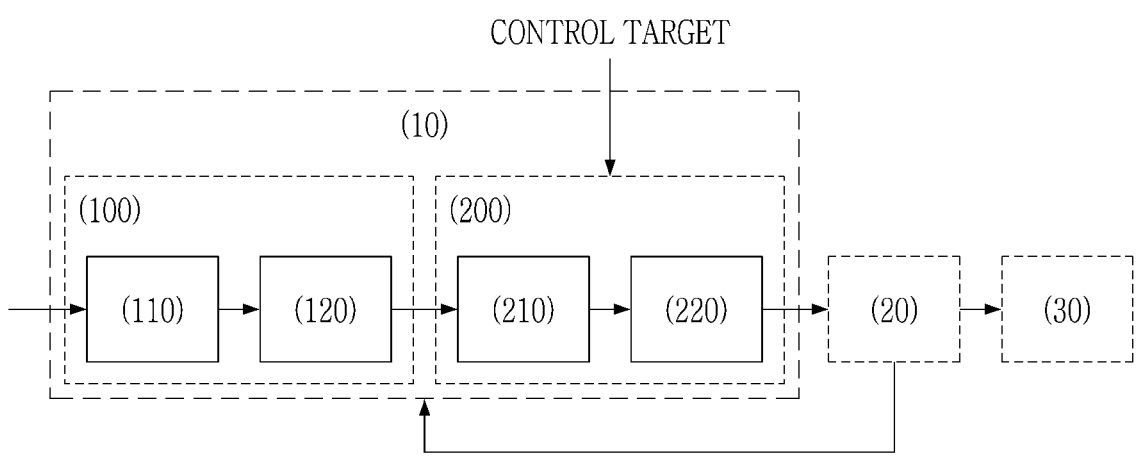
FIG. 1 is a block diagram for explaining a configuration of an apparatus for automatically tuning a fluid temperature PID controller having a physical property of a process as a constraint condition according to an exemplary embodiment.

Various changes and various exemplary embodiments will be described in detail with reference to the accompanying drawings so that those skilled in the art can easily carry out the disclosure. It should be understood, however, that the various embodiments are not for limiting the scope of the disclosure to the particular disclosed forms, but they should be interpreted to include all modifications, equivalents, and alternatives of the embodiments included within the sprit and technical scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the exemplary embodiments are for the purpose of describing specific exemplary embodiments only, and are not intended to limit the scope of the disclosure. The singular forms "a", "an", and "the" are intended to include the plural forms as well unless the context clearly indicates otherwise. In the disclosure, terms such as "comprises," "includes," or "have/has" should be construed as designating that there are such features, integers, steps, operations, components, parts and/or a combination thereof, not to exclude the presence or possibility of adding of one or more other features, integers, steps, operations, components, parts and/or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
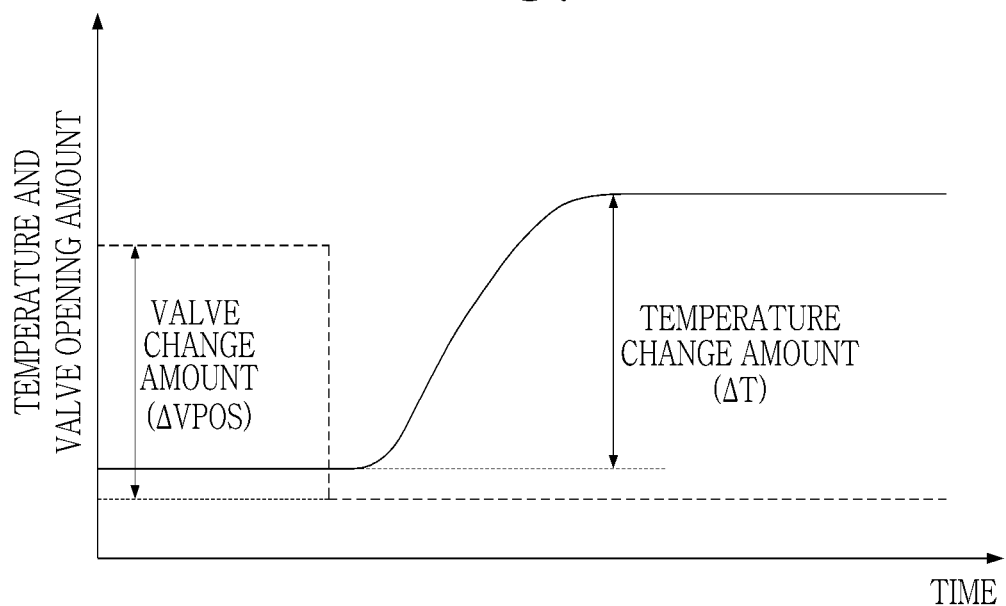
FIG. 2 is a graph for explaining a static property and a dynamic property of a reaction property in a boiler system.
Figure 3:
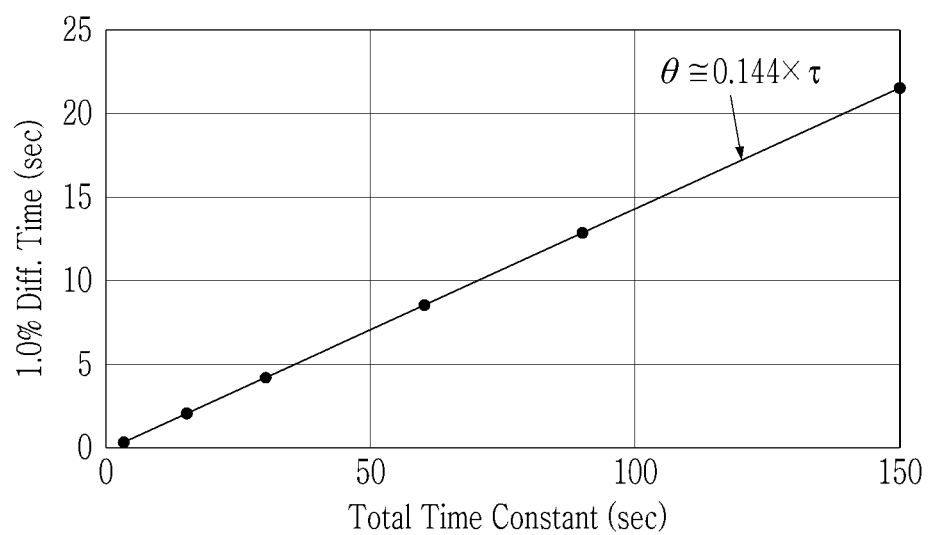
FIG. 3 is a graph for explaining a non-reaction time in the boiler system.
Figure 4:
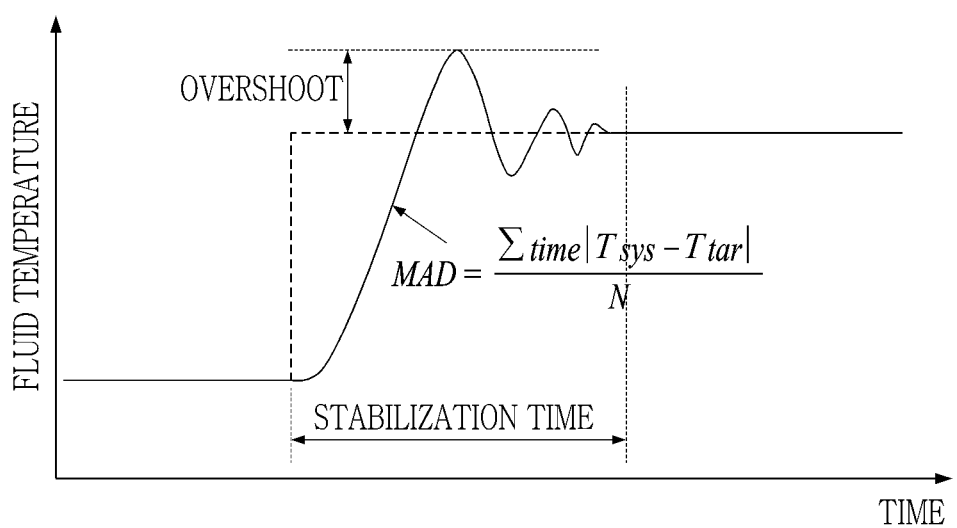
FIG. 4 is a graph for explaining an example of a control target according to an exemplary embodiment.

FIG. 1 is a block diagram for explaining a configuration of an apparatus for automatically tuning a fluid temperature PID controller having a physical property of a process as a constraint condition according to an exemplary embodiment. FIG. 2 is a graph for explaining a static property and a dynamic property of a reaction property in a boiler system. FIG. 3 is a graph for explaining a non-reaction time in the boiler system. FIG. 4 is a graph for explaining an example of a control target according to an exemplary embodiment.

Referring to FIG. 1, an apparatus for automatically tuning a fluid temperature PID controller 10 (hereinafter, referred to as 'tuning apparatus') according to an exemplary embodiment tunes a gain of a proportional-integral-differential (PID) controller 20 (hereinafter, referred to as 'controller') configured to control a fluid temperature within a boiler 30. The tuning apparatus 10 understands a physical property of the fluid temperature and then sets a range of the gain of the controller 20 according to the understood physical property. Then, the tuning apparatus 10 tunes the gain of the controller 20 using an artificial intelligence algorithm to suit a control target selected by a user. To this end, the tuning apparatus 10 according to the exemplary embodiment includes a setter 100 and a tuner 200.

The setter 100 calculates an initial value of the gain of the controller 20 by deriving the physical property of the fluid temperature. The setter 100 includes a property deriver 110 and an initial setter 120.

The property deriver 110 derives the physical property of the fluid temperature. For example, the property deriver 110 may calculate the physical property of the fluid temperature through an energy conservation equation. To calculate the physical property through the energy conservation equation, a fluid flow rate, temperature, specific heat at constant pressure, a fluid volume, a tube mass, and the like are needed. Referring to FIG. 2, the property deriver 110 calculates the physical property of the fluid temperature, that is, a fluid temperature change width and a property time through the energy conservation equation. The property time for the fluid temperature may be derived by the fluid mass and the specific heat at constant pressure, the tube mass and the specific heat at constant pressure, the fluid flow rate, or the like.

For example, Equation 1 below expresses a transient state energy conservation equation.

$$\frac{dE_{sys}}{dt} = \sum \dot{E}_{in} - \sum \dot{E}_{out} \qquad \text{Equation 1}$$

The transient state energy conservation equation may be expressed with the mass of the fluid and the tube, inlet and outlet steam flow rates, and the like within a superheater as expressed in Equation 2 and Equation 3 below.

$$\rightarrow \frac{d}{dt}(m_f \times u_f + m_m \times c_{p.m} \times T_m) = \dot{m}_{in} \times h_{in} - \dot{m}_{out} \times h_{out} + \dot{Q} \qquad \text{Equation 2}$$

$$\rightarrow m_f \times c_{p.f} \times \frac{dT_f}{dt} + m_m \times c_{p.m} \times \frac{dT_m}{dt} \cong \qquad \text{Equation 3}$$
$$\dot{m}_{in} \times c_{p.f} \times (T_{in} - T_{out}) + \dot{Q}$$

In the case of ignoring the thermal expansion and contraction of the tube, a tube density is constant, such that the tube mass is also constant. Therefore, this may be expressed in Equation 4 below.

$$\rightarrow (m_f \times c_{p.f} + m_m \times c_{p.m}) \times \frac{dT_{out}}{dt} \cong \qquad \text{Equation 4}$$

$$\dot{m}_{in} \times c_{p.f} \times (T_{in} - T_{out}) + \dot{Q}$$

Here, because a steam density is changed according to a steam condition, a steam mass within the superheater is also changed. Therefore, the steam mass may be replaced with an average value within an operation range approximately as expressed in Equation 5 below.

$$\rightarrow \frac{\partial}{\partial T_{out}}\left(\frac{dT_{out}}{dt}\right) \cong -\frac{\dot{m}_{in} \times c_{p.f}}{m_{f.avg} \times c_{p.f} + m_m \times c_{p.m}} \qquad \text{Equation 5}$$

Therefore, if the specific heat at constant pressure of the steam is constant, the property time may be expressed in Equation 6 below. Therefore, it may be derived that the property time is inversely proportional to the steam flow rate.

$$\therefore \tau_{T_{out}.1st} \cong \frac{m_{f.avg} \times c_{p.f} + m_m \times c_{p.m}}{\dot{m}_{in} \times c_{p.f}} \qquad \text{Equation 6}$$

The Equation 6 expresses a primary delay property time, and a tertiary delay property time is derived by dividing the primary delay property time by 3 as expressed in Equation 7 below.

$$\rightarrow \tau_{T_{out}.3rd} \cong \frac{\tau_{T_{out}.1st}}{3} \qquad \text{Equation 7}$$

The parameters in Equations 1 to 7 are expressed in Table 1 below.

TABLE 1

| | |
|---|---|
| $E_{sys}$ | Total energy within superheater |
| t | Time |
| $\dot{E}_{in}$, $\dot{E}_{out}$ | Superheater inlet and outlet energies |
| $m_f$, $m_m$ | Steam and tube masses |
| $u_f$ | Superheater inside energy |
| $c_{p.f}$, $c_{p.m}$ | Average specific heat at constant pressure of steam and tube |
| $T_f$, $T_m$ | Average temperatures of steam and tube |
| $\dot{m}_{in}$, $\dot{m}_{out}$ | Superheater inlet and outlet steam flow rates |
| $h_{in}$, $h_{out}$ | Superheater inlet and outlet steam enthalpies |
| $\dot{Q}$ | Superheater heat-input |
| $T_{in}$, $T_{out}$ | Superheater inlet and outlet steam temperature |
| $\tau_{T_{out},1st}$ | Superheater outlet steam primary delay property time |
| $\tau_{T_{out},3rd}$ | Superheater outlet steam tertiary delay property time |

Meanwhile, referring to the graph illustrated in FIG. 2, the reaction property in the boiler system is the fluid temperature change width and the property time, in which the fluid temperature change width represents how much it changes, as a static property, and the property time represents how fast it changes, as a dynamic property. When using the fluid temperature change width, which is the static property, and the property time, which is the dynamic property, the reaction property of the system may be forecasted. Therefore, the reaction property may be derived, and the gain may be inversely derived from a transfer function of the controller 20.

For convenience of calculation, the transfer function of the controller 20 for the fluid temperature is composed of a primary time delay function as expressed in Equation 8 below.

$$G(s) = \frac{K_e^{-\theta s}}{rs + 1}$$ Equation 8

In the transfer function of the PID controller in Equation 8, k refers to the fluid temperature change width which is the static property. The $\tau$ refers to the property time which is the dynamic property. Further, the $\theta$ refers to the non-reaction time as the factor making the control difficult. Meanwhile, in the case of a fluid temperature forecast model, a tertiary time delay function is used to enhance forecast accuracy, and in this case, may be used by dividing the primary delay property time by 3 as expressed in Equation 7.

Referring to the graph illustrated in FIG. 2, the fluid temperature change width which is the static property may be expressed in Equation 9 below.

$$K \cong \frac{\Delta \tau}{\Delta VPOS}$$ Equation 9 where $\Delta VPOS$ refers to a valve change amount, that is, a valve opening change amount, and $\Delta T$ refers to a temperature change amount.

Further, the $\tau$ refers to the property time, which is the dynamic property, in the Equation 8, and may be expressed in Equation 10 below in the same way as that derived in the Equation 6 above.

$$\tau \cong \frac{m_{f.avg} \times c_{p.f} + m_m \times c_{p.m}}{\dot{m}_{in} \times c_{p.f}}$$ Equation 10

Further, the non-reaction time $\theta$ refers to the time at which it takes for 1% to react according to the property time in the Equation 8. Referring to a graph illustrated in FIG. 3, the non-reaction time $\theta$ may be expressed in Equation 11 below.

$$\theta \cong 0.144 \times \tau$$ Equation 11

As described above, when the property deriver 110 derives the physical properties including the fluid temperature change width k, the property time $\tau$, and the non-reaction time $\theta$, the initial setter 120 may derive the initial value of the gain of the controller 20 based on the physical property, that is, the reaction property. The initial setter 120 may derive the initial value of the gain (e.g., proportional, integral, differential gain) of the controller 20 as expressed in Equation 12 below.

$$P = \frac{\Delta VPOS}{\Delta \tau} \times \frac{r}{0.5\theta}$$ Equation 12

$$I = \tau$$

$$D = 0.5\theta$$

where P, I, D refer to proportional, integral, and differential gains of the controller 20, respectively. Further, $\Delta VPOS$ refers to the valve change amount, that is, the valve opening change amount, $\Delta T$ refers to the temperature change amount, $\tau$ refers to the property time, and $\theta$ refers to the non-reaction time.

The tuner 200 receives a control target from the user, and tunes the previously calculated initial value of the gain of the controller by the artificial intelligence algorithm to suit the received control target. Because the exemplary embodiment uses the artificial intelligence algorithm, an optimization target function is freely set, and the exemplary embodiment has high flexibility for setting the control target. For example, the setting of the control target may implement the optimal control performance suitable for the purpose of the system. Referring to FIG. 4, the control target may include, for example, stabilization time minimization, overshoot minimization, transient response deviation minimization, and the like. In FIG. 4, the Equation $$MAD = \frac{\sum_{time} |T_{sys} - T_{tar}|}{N}$$

expresses an average absolute deviation, where the $T_{sys}$, $T_{tar}$ refer to the current temperature and target temperature of the system, respectively.

When the control target is selected by the user and the selected control target is input, the tuner 200 changes the initial value of the gain of the controller 20 to the calculated gain by calculating the gain meeting the control target through the artificial intelligence algorithm. The tuner 200 may assign a weight to each of the control targets, and reset the gain of the controller 20 simultaneously considering the plurality of control targets when the plurality of control targets are input. To tune the gain, the tuner 200 includes a primary tuner 210 and a secondary tuner 220.

The primary tuner 210 derives a primary gain through the artificial intelligence neural network algorithm based on the forecast model for the fluid temperature, and tunes the gain of the controller 20 to the primary gain derived from the initial value. Here, the forecast model is the fluid temperature forecast model expressed by the tertiary time delay function, and expressed in Equation 13 below.

$$T_{Dummy1}^{\tau+1} \cong T_{Dummy1}^{\tau} + (T_{in}^{\tau+1} - T_{Dummy1}^{\tau}) \times (1 - e^{-\frac{\Delta \tau}{r}})$$ Equation 13

$$T_{Dummy2}^{\tau+1} \cong T_{Dummy2}^{\tau} + (T_{Dummy1}^{\tau+1} - T_{Dummy2}^{\tau}) \times (1 - e^{-\frac{\Delta \tau}{r}})$$

$$T_{out}^{\tau+1} \cong T_{out}^{\tau} + (T_{Dummy2}^{\tau+1} - T_{out}^{\tau}) \times (1 - e^{-\frac{\Delta \tau}{r}})$$

where the T refers to the fluid temperature, the $\Delta t$ refers to the time interval, and the $\tau$ refers to the property time for the fluid temperature.

For example, the primary tuner 210 limits the primary gain within a first limit range based on the initial value. For example, the first limit range may become the initial value ±50%. This may limit the range of the primary gain to the calculated initial value ±50% in consideration of a control value calculation algorithm different for each manufacturer. If the range of the primary gain is not limited, the gain may be excessively increased or decreased to an abnormal value which may be generated during calculation, such that the system may become unstable by cycling, hunting, or the like. Therefore, by applying the gain being calculated rather than the final gain to the real system, it is possible to reduce the possible risk.

The secondary tuner 210 derives a secondary gain through the artificial intelligence neural network algorithm based on the real system, that is, the boiler 30, and tunes the gain of the controller 20 to the secondary gain derived from the primary gain.

The secondary tuner 210 limits the secondary gain within a second limit range based on the primary gain. The second limit range is a range smaller than the first limit range. For example, if the first limit range is the initial value ±30%, the second limit range may become the primary gain ±30%. That is, the secondary gain may be limited to the primary gain ±30%.

The primary gain is based on the forecast model and thus is inevitably different from that of the real system, and it is possible to calculate the secondary gain to implement the optimal control performance for the real system, thereby performing the tuning step by step and specifically.

Figure 5:
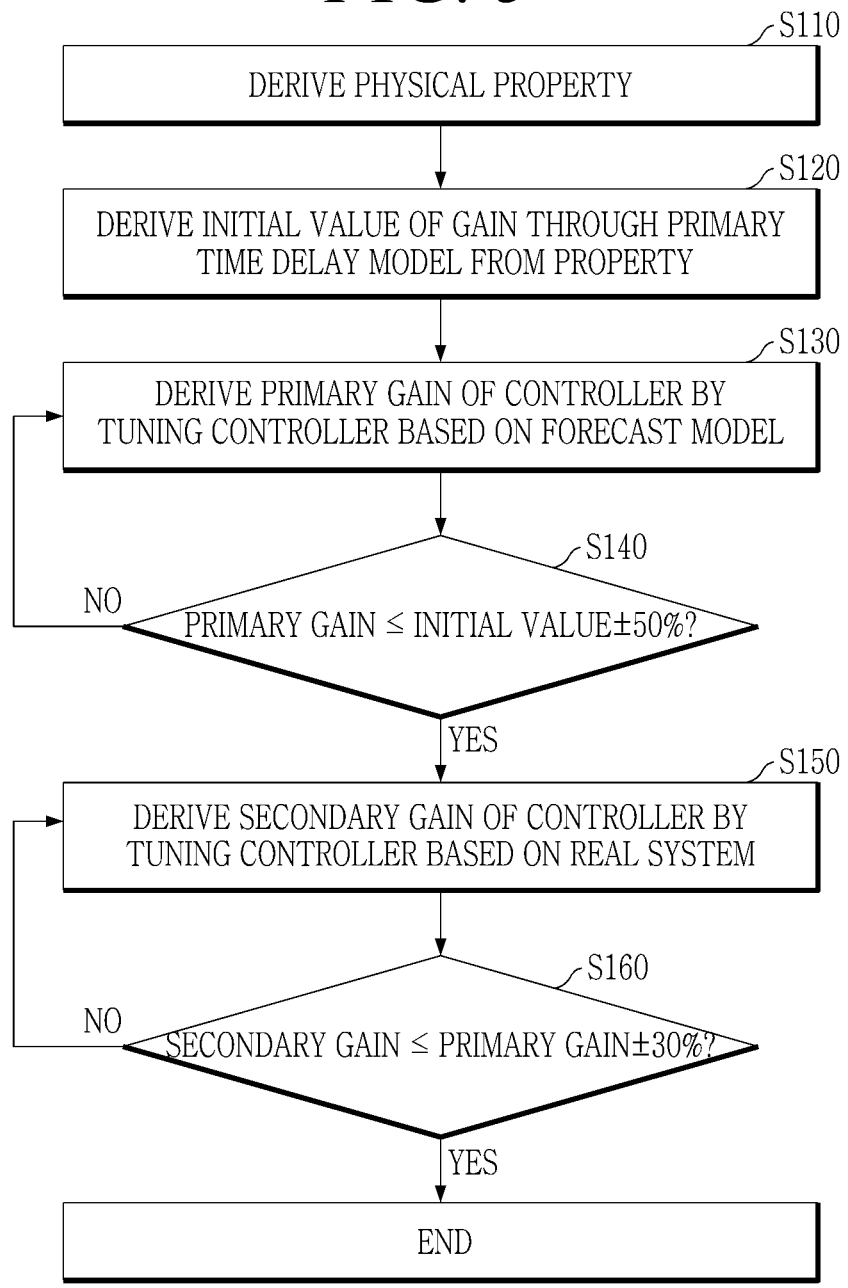
FIG. 5 is a flowchart for explaining a method for automatically tuning a fluid temperature PID controller having a physical property of a process as a constraint condition according to an exemplary embodiment.

FIG. 5 is a flowchart for explaining a method for automatically tuning a fluid temperature PID controller having a physical property of a process as a constraint condition according to an exemplary embodiment.

Referring to FIG. 5, the property deriver 110 of the setter 100 derives the physical property of the fluid temperature (in operation S110). For example, as illustrated in FIG. 2, the property deriver 110 may calculate the physical property of the fluid temperature through the energy conservation equation. The physical property of the fluid temperature includes the fluid temperature change width, the property time, and the non-reaction time. Here, the fluid temperature change width represents how much it changes as the static property, and the property time represents how fast it changes as the dynamic property.

Next, the initial setter 120 of the setter 100 derives the initial value of the gain of the controller through the transfer function of the controller 20 from the physical property of the fluid temperature (in operation S120). For convenience of calculation, the transfer function of the controller 20 for the fluid temperature is composed of the primary time delay function expressed in the Equation 8. That is, the initial setter 120 may derive the fluid temperature change width k, which is the static property, the property time τ, which is the dynamic property, and the non-reaction time θ as expressed in Equations 9 to 11 in the transfer function of the controller, and as expressed in Equation 12, derive the initial value of the gain (e.g., proportional, integral, and differential gain) of the controller 20.

The tuner 200 receives the control target from the user, and tunes the initial value of the previously calculated gain of the controller by the artificial intelligence algorithm to suit the received control target. As in the example illustrated in FIG. 4, the control target may exemplify stabilization time minimization, overshoot minimization, transient response deviation minimization, and the like. To this end, the primary tuner 210 of the tuner 200 first derives the primary gain through the artificial intelligence neural network algorithm based on the forecast model for the fluid temperature (in operation S130), and tunes the gain of the controller 20 to the primary gain derived from the initial value. Here, the forecast model is the fluid temperature forecast model expressed by the tertiary time delay function, as expressed in Equation 13.

For example, the primary tuner 210 limits the primary gain within the first limit range based on the initial value. For example, the first limit range may become the initial value ±50%. This may limit the range of the primary gain to the calculated initial value ±50% in consideration of the control value calculation algorithm different for each manufacturer. If the range of the primary gain is not limited, the gain is excessively increased or decreased to an abnormal value which may be generated during calculation, such that the system may become unstable by cycling, hunting, or the like. Therefore, by applying the gain being calculated rather than the final gain to the real system, it is possible to reduce the possible risk. Therefore, the primary tuner 210 determines whether the primary gain is the first limit range or less (in operation S140). As the determination result of the operation S140, the primary tuner 210 proceeds to operation S150 only if the primary gain is the first limit range or less.

Next, the secondary tuner 220 of the tuner 200 derives the second gain through the artificial intelligence neural network algorithm based on the real system, that is, the boiler 30 in operation S150, and tunes the gain of the controller 20 to the secondary gain derived from the primary gain.

The secondary tuner 220 limits the secondary gain within the second limit range based on the primary gain. The second limit range is a range smaller than the first limit range. For example, if the first limit range is the initial value ±30%, the second limit range may become the primary gain ±30%. That is, the secondary gain may be limited to the primary gain ±30%.

Therefore, the secondary tuner 220 determines whether the secondary gain is the second limit range or less (in operation S160). If the secondary gain is the second limit range or less, the secondary tuner 220 terminates the tuning process.

As described above, according to the exemplary embodiment, the primary gain is based on the forecast model and thus may be different from that of the real system. However, the exemplary embodiment calculates the secondary gain so as to implement the optimal control performance for the real system to perform the tuning step by step and specifically, thereby improving the efficiency and precision of the tuning.

The exemplary embodiment solves the limitation of the related art PID controller tuning method which depends on experience, and provides the method for automatically tuning the fluid temperature PID controller using the physical property of the process and the artificial intelligence algorithm. The exemplary embodiment may provide the method capable of more easily tuning the PID controller in various industrial sites in which the fluid temperature control is used and furthermore, perform the specific tuning, thereby improving the control performance. To this end, the exemplary embodiment understands the physical property of the fluid temperature to set the range of the gain of the controller based on the physical property of the fluid temperature, and then detects the gain by the artificial intelligence algorithm to suit the control target selected by the user. Further, the exemplary embodiment may set the gain limit range in consideration of the physical property of the process, and then find the suitable gain by the artificial intelligence algorithm, thereby preventing the gain from being excessively increased or decreased, and may be widely used regardless of the PID controller manufacturer. Further, the exemplary embodiment may automatically tune the PID controller for the fluid temperature control, thereby reducing the human working time required for tuning the controller. Further, the exemplary embodiment may consider the physical property and use the artificial intelligence algorithm to set the initial gain and perform the specific tuning, thereby improving the fluid temperature control performance. Further, the exemplary embodiment may adopt the concept proposed by the exemplary embodiment as it is when only the property of the process is understood if the property of the process is different and thus may be utilized in various fields other than the fluid temperature control.

Figure 6:
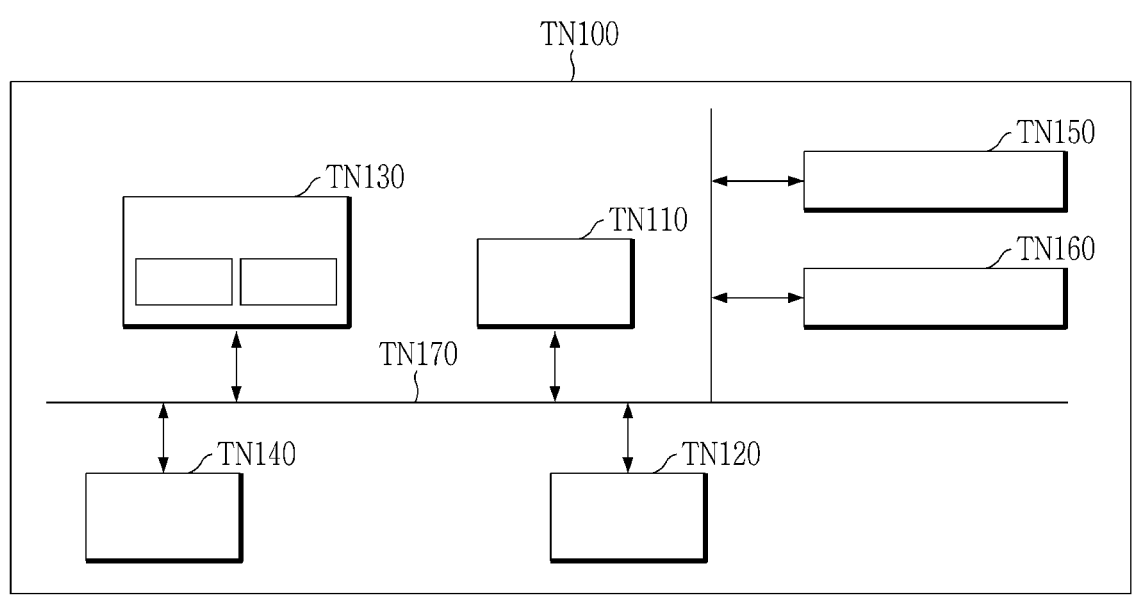
FIG. 6 is a diagram illustrating a computing apparatus according to an exemplary embodiment.

FIG. 6 is a diagram illustrating a computing apparatus according to an exemplary embodiment. A computing apparatus TN100 may be the apparatus described in the present specification (e.g., apparatus for automatically tuning a fluid temperature PID controller having the physical property of the process as the constraint condition or the like).

Referring to FIG. 6, the computing apparatus TN100 may include at least one processor TN110, a transceiver TN120, a memory TN130. The computing apparatus TN100 may further include a storage TN140, an input interface TN150, and an output interface TN160. The components included in the computing apparatus TN100 may be connected by a bus TN170 and communicate with each other.

The processor TN110 may execute a program command stored in at least one of the memory TN130 and the storage TN140. The processor TN110 may include a central processing unit (CPU), a graphics processing unit (GPU), or a dedicated processor in which the methods according to the exemplary embodiment are performed. The processor TN110 may be configured to implement the procedure, function, method, and the like described with regard to the exemplary embodiment. The processor TN110 may control each component of the computing apparatus TN100.

Each of the memory TN130 and the storage TN140 may store various information related to an operation of the processor TN110. Each of the memory TN130 and the storage TN140 may be composed of at least one of a volatile storage medium and a non-volatile storage medium. For example, the memory TN130 may be composed of at least one of a read only memory (ROM) and a random access memory (RAM).

The transceiver TN120 may transmit and/or receive a wired signal or a wireless signal. The transceiver TN120 may be connected to a network to perform communication.

Meanwhile, various methods according to the exemplary embodiment described above may be implemented in the form of a readable program through various computer means and recorded in a computer readable recording medium. Here, the recording medium may include program commands, data files, data structures, and the like alone or in combination thereof. The program command recorded in the recording medium may be those specially designed and configured for the exemplary embodiment or may also be those known and available to those skilled in the art of computer software. For example, the recording medium includes a hardware device specially configured to store and execute the program commands such as magnetic media such as a hard disk, a floppy disk, and a magnetic tape, optical media such as a CD-ROM and a DVD, magneto-optical media such as a floptical disk, a ROM, a RAM, or a flash memory. Examples of the program commands may include a high-level language wire which may be executed by a computer using an interpreter or the like as well as a machine language wire as produced by a compiler. The hardware device may be configured to operate as one or more software modules in order to perform the operation of the exemplary embodiment, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. An apparatus for automatically tuning a fluid temperature PID (proportional-integral-differential) controller comprising:

a setting circuitry configured to calculate an initial value of a gain of the fluid temperature PID controller configured to control a fluid temperature by deriving a physical property of the fluid temperature; and a tuning circuitry configured to tune the initial value of the gain of the fluid temperature PID controller using an artificial intelligence neural network algorithm according to a control target, wherein the tuning circuitry comprises a primary tuning circuitry configured to derive a primary gain through the artificial intelligence neural network algorithm based on a forecast model, the forecast model being a fluid temperature forecast model expressed by a tertiary time delay function, wherein the tertiary time delay function is derived by dividing a primary delay property time by three, the primary delay property time being derived from a time property which is derived by a fluid mass and a specific heat at constant pressure, a tube mass and the specific heat at constant pressure, and a fluid flow rate.

2. The apparatus for automatically tuning the fluid temperature PID controller of claim 1,
   wherein the primary tuning circuitry derives the primary gain through the artificial intelligence neural network algorithm and tunes the gain of the fluid temperature PID controller to the primary gain derived from the initial value.

3. The apparatus for automatically tuning the fluid temperature PID controller of claim 2,
   wherein the primary gain has a first limit range based on the initial value.

4. The apparatus for automatically tuning the fluid temperature PID controller of claim 2,
   wherein the tuning circuitry further comprises a secondary tuning circuitry configured to derive a secondary gain through the artificial intelligence neural network algorithm based on a real system, and to tune the gain of the fluid temperature PID controller to a secondary gain derived from the primary gain.

5. The apparatus for automatically tuning the fluid temperature PID controller of claim 4,
   wherein the secondary gain has a second limit range based on the primary gain, the second limit range being a range smaller than the first limit range.

6. The apparatus for automatically tuning the fluid temperature PID controller of claim 1,
   wherein the setting circuitry comprises a property deriving circuitry configured to calculate the physical property of the fluid temperature through an energy conservation equation.

7. The apparatus for automatically tuning the fluid temperature PID controller of claim 6,
   wherein the physical property of the fluid temperature comprises at least one of a fluid temperature change width, a property time, and a non-reaction time.

8. The apparatus for automatically tuning the fluid temperature PID controller of claim 6,
   wherein the setting circuitry further comprises an initial setting circuitry configured to derive the initial value of the gain of the fluid temperature PID controller from the physical property of the fluid temperature.

9. The apparatus for automatically tuning the fluid temperature PID controller of claim 1,
   wherein the control target comprises at least one of stabilization time minimization, overshoot minimization, and transient response deviation minimization.

10. An apparatus for automatically tuning a fluid temperature PID (proportional-integral-differential) controller comprising:
 a setting circuitry configured to calculate a physical property of a fluid temperature through an energy conservation equation, and to derive an initial value of a gain of the fluid temperature PID controller configured to control the fluid temperature from the calculated physical property of the fluid temperature; and
 a tuning circuitry configured to tune the initial value of the gain of the fluid temperature PID controller using an artificial intelligence neural network algorithm according to a control target,
 wherein the initial value of the gain of the fluid temperature PID controller is inversely derived from a transfer function of the fluid temperature PID controller, the transfer function of the fluid temperature PID controller being composed of a primary time delay function which is derived from a time property through the energy conservation equation.

11. The apparatus for automatically tuning the fluid temperature PID controller of claim 10,
 wherein the tuning circuitry comprises:
 a primary tuning circuitry configured to derive a primary gain by tuning the initial value of the gain of the fluid temperature PID controller based on a forecast model; and
 a secondary tuning circuitry configured to derive a secondary gain by tuning the derived primary gain based on a real system.

12. The apparatus for automatically tuning the fluid temperature PID controller of claim 11,
 wherein the forecast model is a fluid temperature forecast model expressed by a tertiary time delay function, the tertiary time delay function being derived by dividing the primary delay property time by three.

13. The apparatus for automatically tuning the fluid temperature PID controller of claim 11,
 wherein the primary gain has a first limit range based on the initial value, and
 wherein the secondary gain has a second limit range based on the primary gain, the second limit range being a range smaller than the first limit range.

14. A method for automatically tuning a fluid temperature PID (proportional-integral-differential) controller, the method comprising:
 calculating, by a setting circuitry, an initial value of a gain of the fluid temperature PID controller configured to control a fluid temperature by deriving a physical property of the fluid temperature; and
 tuning, by a tuning circuitry, the initial value of the gain of the fluid temperature PID controller using an artificial intelligence neural network algorithm according to a control target,
 wherein the tuning of the initial value of the gain of the fluid temperature PID controller comprises deriving, a primary tuning circuitry of the tuning circuitry, a primary gain by tuning the initial value of the gain of the fluid temperature PID controller based on a forecast model, the forecast model being a fluid temperature forecast model expressed by a tertiary time delay function,
 wherein the tertiary time delay function is derived by dividing a primary delay property time by three, the primary delay property time being derived from a time property which is derived by a fluid mass and a specific heat at constant pressure, a tube mass and the specific heat at constant pressure, and a fluid flow rate through an energy conservation equation.

15. The method of claim 14,
 wherein the tuning of the initial value of the gain of the fluid temperature PID controller further comprises:
 deriving, by a secondary tuning circuitry of the tuning circuitry a secondary gain by tuning the derived primary gain based on a real system.

16. The method of claim 15,
 wherein the primary gain has a first limit range based on the initial value, and
 wherein the secondary gain has a second limit range based on the primary gain, the second limit range being a range smaller than the first limit range.

17. The method of claim 14,
 wherein the calculating of the initial value of the gain of the fluid temperature PID controller comprises:
 calculating, by a property deriving circuitry of the setting circuitry, the physical property of the fluid temperature through the energy conservation equation; and
 deriving, by an initial setting circuitry of the setting circuitry, the initial value of the gain of the fluid temperature PID controller from the physical property of the fluid temperature.

18. The method of claim 14,
 wherein the physical property of the fluid temperature comprises at least one of a fluid temperature change width, a property time, and a non-reaction time.

* * * * *